March 22, 1960 M. D. O'DAY ET AL 2,929,925
TRANSPONDER SYSTEM RESPONSIVE TO SIMULTANEOUS IDENTIFICATION AND OBJECT LOCATING SIGNALS
Filed Jan. 3, 1946
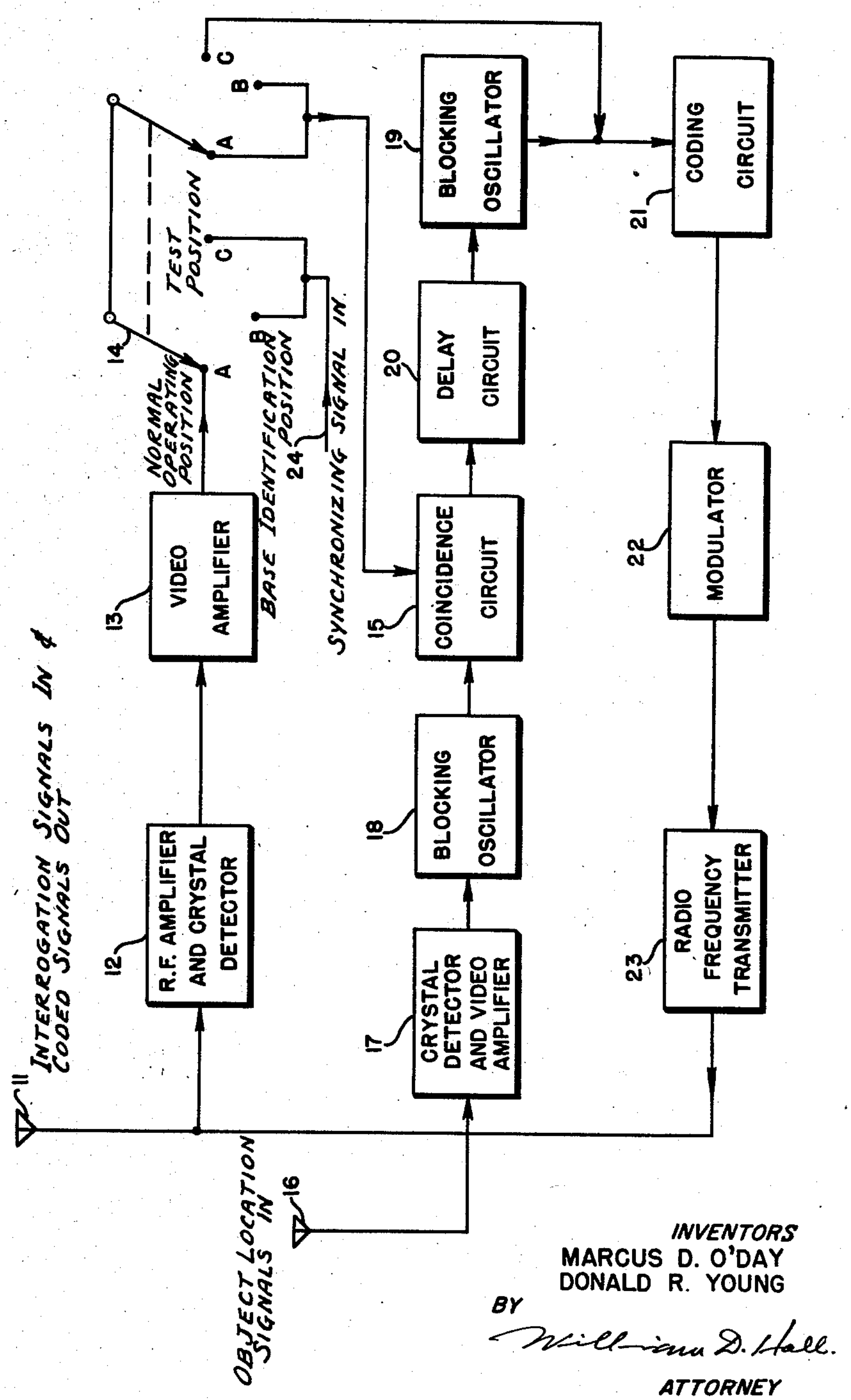
INVENTORS
MARCUS D. O'DAY
DONALD R. YOUNG
BY William D. Hall.
ATTORNEY 2,929,925

TRANSPONDER SYSTEM RESPONSIVE TO SIMULTANEOUS IDENTIFICATION AND OBJECT LOCATING SIGNALS

Marcus D. O'Day, Arlington, and Donald R. Young, Cambridge, Mass., assignors, by mesne assignments, to the United States of America as represented by the Secretary of War Application January 3, 1946, Serial No. 638,891

1 Claim. (Cl. 250—17)

This invention relates generally to radio communication systems and more particularly to receiver-transmitters for such systems.

In some communication systems, it is necessary for one station to establish the identity of a second station in a relatively short time. In practice, an interrogating signal is transmitted from one station to a receiver-transmitter system at the second station. The receiver-transmitter system accepts the interrogating signal and transmits a plurality of signals comprising an identifying code back to the first station. A radio receiver at the first station demodulates the coded signals and the second station is thereby identified. Such systems are known as beacons.

To make identification more positive and more secure, the interrogating station transmits two signals simultaneously at two different frequencies. The present invention deals with such a system.

It is an object, therefore, of this invention to provide a system which will receive and retransmit radio signals.

It is a further object of this invention to provide a system which will produce a coded signal when interrogated by a radio signal.

It is a still further object of this invention to provide a system which will produce a coded output signal when interrogated with two simultaneous signals of different frequencies.

In general, this invention utilizes two receiver channels for the two interrogating frequencies. The outputs of the two channels are applied to a coincidence circuit, which is activated if the two incoming signals occur substantially simultaneously and if the two signals are of the correct frequency. The coincidence circuit output pulse is applied to a coding circuit which triggers a modulator which in turn pulses a radio transmitter.

Other objects, features, and advantages of this invention will suggest themselves to those skilled in the art and will become apparent from the following description of the invention taken in connection with the accompanying drawing in which the sole figure is a schematic block diagram of the invention.

Referring now to the drawing, antenna 11 is coupled to the input of a radio frequency amplifier and crystal detector 12 whose output is coupled to the input of a video amplifier 13. The output of the video amplifier 13 is coupled through a double-pole triple-throw switch to the input of a coincidence circuit 15. One such circuit might be for instance such as that described in the application of Leon Bess, Serial No. 617,372, and filed September 19, 1945, now Patent No. 2,538,500. An antenna 16 is coupled to the input of a crystal detector and video amplifier 17 whose output is coupled to the input of a blocking oscillator 18. The output of the blocking oscillator 18 is also coupled to the input of the coincidence circuit 15. The output of the coincidence circuit 15 is coupled to the input of a delay blocking oscillator 19 through a delay circuit 20. The output of the blocking oscillator 19 is coupled to the input of a coding circuit 21. One such circuit might be for instance such as that described in the application of Paul L. Sagalyn, Serial No. 623,401, entitled "Electrical Circuit," and filed October 19, 1945, now Patent No. 2,600,268. The output of the coding circuit 21 is coupled to the input of a modulator 22 whose output is coupled to the input of a radio frequency transmitter 23, the output of which is applied to antenna 11.

In operation radio frequency signals of one frequency, hereinafter referred to as frequency "A," impinge on antenna 11 and are thereby transmitted to amplifier and detector 12 and after detection are further amplified by video amplifier 13. The output of the video amplifier 13 is then applied to the coincidence circuit 15 disregarding the function of the switch 14 for the moment. Radio frequency signals of another frequency, hereinafter referred to as frequency "B," impinge on antenna 16, being detected and amplified by detector and amplifier 17 whose output triggers the blocking oscillator 18. The blocking oscillator pulse is applied to the coincidence circuit 15. The output signal from the video amplifier 13 and the blocking oscillator pulse should occur at substantially the same time; therefore the coincidence circuit is actuated. The blocking oscillator 18 is used in this case to form a gate to allow for a tolerable discrepancy of the times of the two pulses.

The output pulse from the coincidence circuit 15 after being delayed by the delay circuit 20, triggers the blocking oscillator 19 whose output pulse is used to trigger the coding circuit 21. The coded output pulses are applied to the modulator 22 which pulses the radio frequency transmitter 23 whose output is radiated by means of antenna 11. The output is in the form of radio frequency pulses spaced according to the design of the coding circuit 21 and the frequency of these pulses in actual practice has been the same as frequency "A." The delay caused by the delay circuit 20 provides a predetermined spacing between an echo signal of a radio object locating device at the interrogating station and the coded signal. This prevents confusion in identifying the two signals.

In practice this system is used in conjunction with radio object locating systems, in which the radio object locating device is carried in an aircraft and information is relayed by radio from the aircraft to its carrier base, for instance, and is presented on conventional indicators on the carrier. The beacon system described above is installed on the carrier in order that the aircraft pilot can distinguish between signals from the carrier and identifying signals from other aircraft.

If it is desired to more positively identify the carrier signal, the aircraft pilot will shut off his interrogating signal and radio the carrier to place the switch 14 in position B, its normal position being A. Without the interrogating signal, other beacon devices will not be actuated and they present no signal at the aircraft. However, the beacon at the carrier is actuated since it receives the transmitter pulse at antenna 16 from the radio object locating device at the aircraft and in addition, a synchronizing pulse from the aircraft, used in relaying information from the aircraft to the carrier. This synchronizing pulse, which occurs at substantially the same time as the radio object locating device transmitter pulse, is applied by any convenient means to point 24. The coincidence circuit 15 is actuated as before and the beacon transmits its characteristic signal.

Position C of switch 14 is provided for test purposes and permits operation of the coding circuit 21 and the transmitting channel to be checked independently of the receiving channels.

In practice, the signals received by antenna 11, being at frequency "A" are interrogating signals from the aircraft, while the signals received at antenna 16, being at frequency "B," are pulse signals from the radio object locating device in the plane.

It is considered unnecessary to illustrate the elements of the circuit which have been shown in block diagram form and which are so well known that numerous forms thereof may be utilized. For instance the R.-F. amplifier and crystal detector means, the video amplifier, blocking oscillator, modulator and the transmitter are all elements which are so common to the art that any one of numerous forms may be selected in accordance with the desires of the designer of the apparatus. On the other hand, elements which are not so well known, such for instance, as the coincidence circuit and the coder circuit have been incorporated therein by referring to specific exemplary forms thereof contained in previous applications.

While there has been described what is at present the preferred embodiment of this invention, it will be obvious to those skilled in the art that various changes and modifications may be made therein without departing from the scope of the invention as set forth in the appended claims, and I claim all such changes and modifications as may fall fairly within the spirit and scope of the invention.

What is claimed is:

In a receiver-transmitter apparatus a first means for receiving signals of a predetermined frequency, means to detect said signals, switch means, a coincidence circuit receptive of two signals and providing an output upon the simultaneous occurrence of said signals, means subject to the switching action of said switching means to impress the output of said detecting means onto said coincidence circuit, means to receive signals of a second predetermined frequency, means for detecting said second received signals, means actuated by said second received signals for generating a control pulse, means for impressing said control pulse onto said coincidence circuit, means for impressing the output of said coincidence circuit onto a second pulse generating means, a coding circuit, means for impressing the output of said second pulse generating circuit onto said coding circuit for actuating the latter, and means responsive to said coding circuit for transmitting signals of a predeterminable frequency in a desired code.

References Cited in the file of this patent

UNITED STATES PATENTS

| | | |
|---|---|---|
| 1,894,019 | Buckley | Jan. 10, 1933 |
| 2,211,942 | White | Aug. 20, 1940 |
| 2,252,083 | Luck | Aug. 12, 1941 |
| 2,402,459 | Smith | June 18, 1946 |
| 2,415,359 | Loughlin | Feb. 4, 1947 |
| 2,415,919 | Thomas | Feb. 18, 1947 |